M. LACHMAN.
METAL WHEEL.
APPLICATION FILED AUG. 17, 1918.
1,308,849.
Patented July 8, 1919.
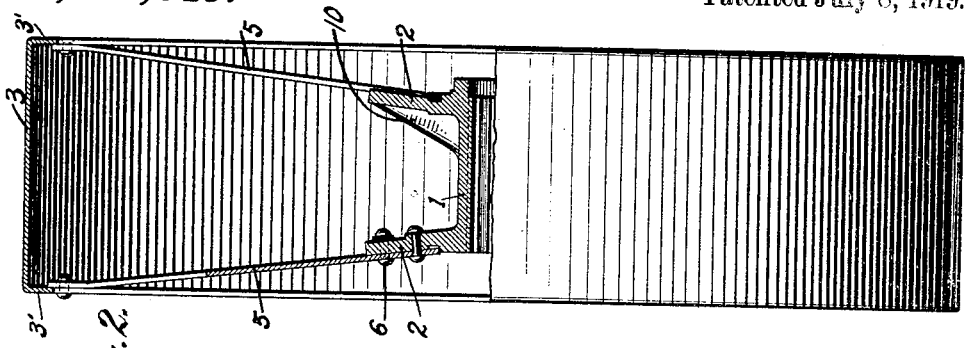
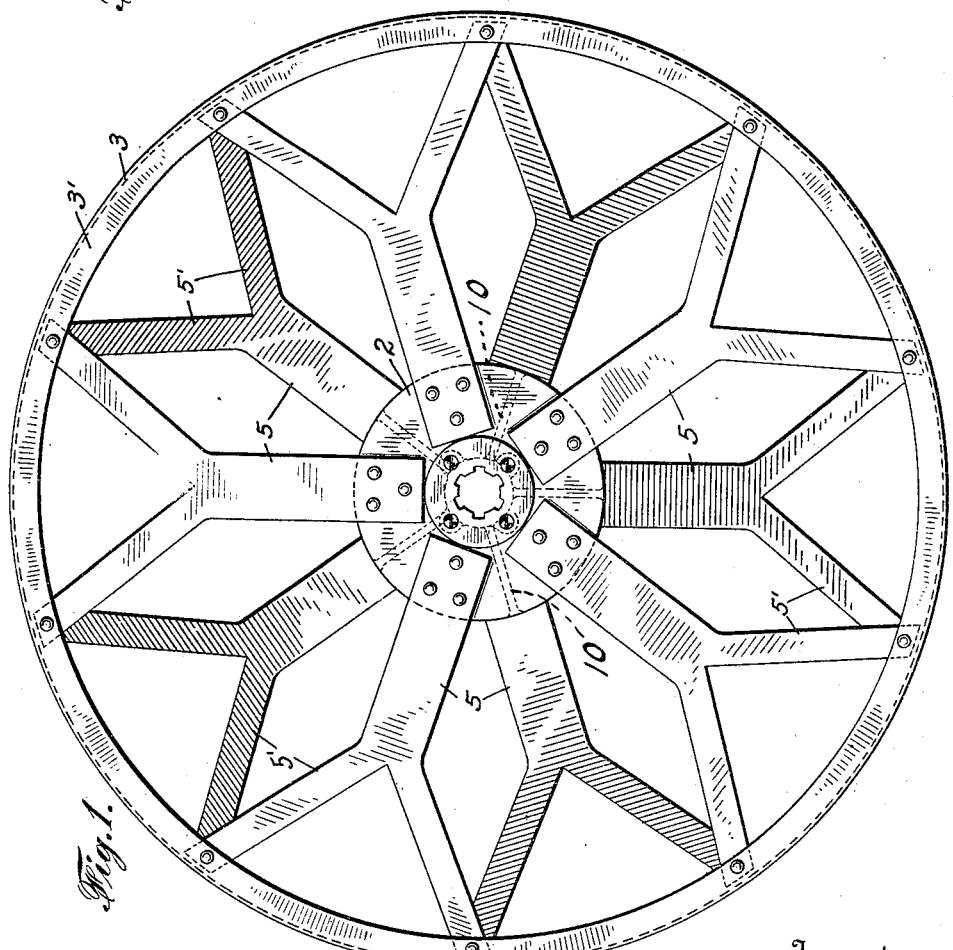
Inventor
Maurice Lachman
By his Attorneys
Townsend & Decker

UNITED STATES PATENT OFFICE.

MAURICE LACHMAN, OF NEW YORK, N. Y., ASSIGNOR TO STRUCTURAL PRESSED STEEL WHEEL COMPANY, INC., OF NEW YORK, N. Y., A CORPORATION OF NEW YORK.

METAL WHEEL.

1,308,849.   Specification of Letters Patent.   Patented July 8, 1919.

Application filed August 17, 1918. Serial No. 250,306.

*To all whom it may concern:*

Be it known that I, MAURICE LACHMAN, a citizen of the United States, and a resident of New York, in the county of New York and State of New York, have invented certain new and useful Improvements in Metal Wheels, of which the following is a specification.

My invention relates to the construction of metal wheels and its object is to produce a wheel of a minimum number of parts and at a minimum cost and of a maximum strength.

To these ends my invention consists in a construction of wheel embodying flanged hub and rim members and sheet metal spoke members combined with and secured to the rim and hub members as hereinafter more particularly described.

In the accompanying drawings Figure 1 is a side elevation of a part of a wheel constructed in accordance with my invention.

Fig. 2 is a transverse section through one side of the wheel taking in one side of the hub and rim.

1 indicates the metal hub having the flanges 2 extending radially outward therefrom and preferably inclined outwardly in a plane inclined to the general plane of the wheel. 3 indicates the metal rim having at its opposite sides flanges 3' extending preferably radially inward. In the construction shown, the width of the rim is considerably greater than the width of the hub. The inclination of the flanges is such that when the diverging spokes are secured by their flat sides to the faces of said flanges there will be no necessary bend in the spokes where they meet the periphery of the flanges. As will be seen this relation of hub and rim when they are connected by spoke members applied as shown gives in effect a wheel dished on both faces thereby providing great resistance to collapse under lateral strain. 5 indicates the spoke members, said spoke members comprising strips of metal fastened by riveting, welding or otherwise as indicated at 6 to the flat sides or faces of the hub flanges 2 and fastened or connected in any suitable way to the rim as for instance by riveting to a flange of the rim. Obviously they might be fastened either to the inside or the outside of the flanges 2 3'. The face of said hub flanges to which the flat side of said spokes is applied is furnished as shown with a circumferential shoulder or offset forming a ledge against which the end of the sheet metal spoke rests so as to avoid tendency to shearing of the rivets by which the flanges and spokes are secured together. In the preferable form of my invention the spoke member 5 is forked or bifurcated into legs or members 5' which are integral with the body 5 of the spoke and are secured respectively at points of the rim removed circumferentially from one another. Preferably the spokes 5 on one side of the wheel are staggered or alternated with those on the other side in their circumferential positions and preferably the ends of the bifurcations 5' of a spoke on one side are located in the same circumferential positions as the bifurcations of spokes on the opposite side and as indicated in the drawing. As will be seen the effect of thus locating the bodies of the spokes on the opposite sides of the wheel in different radial positions respectively and attaching their arms to the rim in the same or approximately the same locations peripherally, is that the compression load on the rim at the peripheral portions thereof where the legs of the Y-shaped spokes are attached is received at the center or highest point of an arch the sides of which comprise the bodies of two spokes resting respectively at separated points on the hub and one arm of the Y of each spoke while the remaining arms of the said two spokes reinforce the sides of the arch against lateral thrust in the plane of the wheel. At the same time the staggered relation of the spokes on the opposite side of the wheel with respect to one another reduces the total number of spokes necessary to secure this effect.

This arrangement may be varied without departing from my invention. In constructing the spoke with bifurcation or forked end integral with the body thereto, it is only necessary to slit the end of a metal strip of uniform width the same preferably as the width of the body of the spoke and then to separate the bifurcations to produce the form of complete spoke member shown by simply forcing the bifurcations apart, the operation being assisted if desired by heating the metal at the point of divergence of the outer spoke ends. As will be seen the wheel may be constructed rapidly of standard parts and forms of commercial metal and a wheel of great strength may be produced. The method of manufacturing the wheel as thus described is not claimed in the present application but forms the subject of application filed by me May 6th 1919, Serial No. 295,223, as a division of the present application.

The hub 1 and flanges 2 are preferably cast or otherwise suitably formed in one piece and if desired provided with strengthening ribs 10 for either or both of the flanges 2.

What I claim as my invention is:—

1. A metal wheel having spoke members consisting of Y-shaped metal strips the bodies of which occupy different positions circumferentially on opposite sides of the wheel respectively but having the outer ends of the arms of the Y connected to the rim at substantially the same circumferential point as and for the purpose described.

2. In a metal wheel, the combination with a rim and hub, of sheet metal Y-shaped spokes the bodies of which on opposite sides of the wheel respectively are connected to the hub in different positions circumferentially while their arms are connected to the same peripheral points on the rim, the body of each spoke in connection with one of its arms forming a side of an arch the highest point of which is the point of connection to the rim, while the opposite side of the arch is formed by similar parts of a spoke on the opposite side of the wheel, the remaining arms of each Y-shaped spoke serving to reinforce the sides of the arch against tendency to spread in the plane of the wheel.

Signed at New York in the county of New York and State of New York this 15th day of August A. D. 1918.

MAURICE LACHMAN.

Witnesses:
F. B. TOWNSEND,
F. E. ROESLER.